United States Patent
Babao et al.

(12)

(10) Patent No.: US 10,311,459 B1
(45) Date of Patent: Jun. 4, 2019

(54) USER RECOGNITION BASED USER EXPERIENCE PLATFORM

(71) Applicant: Capital One Services, LLC, McLean, VA (US)

(72) Inventors: Polerio Babao, Norridge, IL (US); Natalie Cherco, Deerfield, IL (US); Kayne Kantorowicz, DeKalb, IL (US); Christina Garcia, Aurora, IL (US); Steven Gliniewicz, Streamwood, IL (US); Arindam Chakraborty, Hoffman Estates, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/945,406

(22) Filed: Apr. 4, 2018

(51) Int. Cl.
*G06Q 30/02* (2012.01)
*G06K 9/00* (2006.01)

(52) U.S. Cl.
CPC ..... *G06Q 30/0224* (2013.01); *G06K 9/00288* (2013.01); *G06Q 30/0255* (2013.01); *G06Q 30/0267* (2013.01); *G06Q 30/0281* (2013.01)

(58) Field of Classification Search
CPC ..................................................... G06Q 30/02

USPC ........................................................ 705/7.29
See application file for complete search history.

(56) References Cited

U.S. PATENT DOCUMENTS

| | | | |
|---|---|---|---|
| 5,331,544 A | 7/1994 | Lu et al. | |
| 6,554,705 B1 | 4/2003 | Cumbers | |
| 7,357,717 B1 | 4/2008 | Cumbers | |
| 9,760,905 B2 * | 9/2017 | Yoder | G06Q 30/0201 |
| 2003/0018522 A1 | 1/2003 | Denimarck et al. | |
| 2015/0025936 A1 * | 1/2015 | Garel | G06Q 30/0201 |
| | | | 705/7.29 |
| 2018/0349736 A1 * | 12/2018 | Bapat | G06K 9/00268 |

* cited by examiner

*Primary Examiner* — Marilyn G Macasiano
(74) *Attorney, Agent, or Firm* — Harrity & Harrity, LLP

(57) ABSTRACT

A device may receive, from a camera device, an image that includes a person. The device may provide the image to a user recognition device and receive, from the user recognition device, a user identifier based on the person included in the image. In addition, the device may obtain user data based on the user identifier, the user data relating to prior activity relating to the person associated with the user identifier. The device may identify a user device based on a first physical location associated with the camera device and a second physical location associated with the user device, and provide the user data to the user device.

20 Claims, 4 Drawing Sheets

USER RECOGNITION BASED USER EXPERIENCE PLATFORM

BACKGROUND

A variety of computer implemented technologies exist that are capable of identifying people based on a visual characteristics. For example, images and/or video of a person, or an object worn or held by a person, can be provided to a facial recognition system, gait analysis system, object identification system, and/or the like, to identify the person included in the images and/or video.

SUMMARY

According to some implementations, a device may comprise: one or more memory devices; and one or more processors, communicatively connected to the one or more memory devices, to: receive, from a camera device, an image that includes a person; provide the image to a user recognition device; receive, from the user recognition device, a user identifier based on the person included in the image; obtain user data based on the user identifier, the user data relating to prior activity relating to the person associated with the user identifier; identify a user device based on, a first physical location associated with the camera device, and a second physical location associated with the user device; and provide the user data to the user device.

According to some possible implementations, a non-transitory computer-readable medium may store instructions, the instructions comprising: one or more instructions that, when executed by one or more processors, cause the one or more processors to: receive, from a camera device, an image that includes a person; provide the image to a user recognition device; obtain, from the user recognition device, a user identifier associated with the person included in the image; obtain user data based on the user identifier, the user data including: previously collected information regarding the person associated with the user identifier, or a previously captured image of the person associated with the user identifier; identify a user device based on, a first physical location associated with the camera device, and a second physical location associated with the user device; and provide the user data to the user device.

According to some implementations, a method may comprise: receiving, by a first device and from a camera device, an image that includes a person; obtaining, by the first device, a user identifier associated with the person included in the image; obtaining, by the first device, from a user data storage device, and based on the user identifier, user data, the user data including: previously collected information regarding the person associated with the user identifier, and a previously captured image of the person associated with the user identifier; identifying, by the first device, user experience data, the user experience data including a suggested offer for the person associated with the user identifier, the suggested offer being based on the user data; and causing, by the first device, display of the user data and the suggested offer.

DETAILED DESCRIPTION

Figure 1:
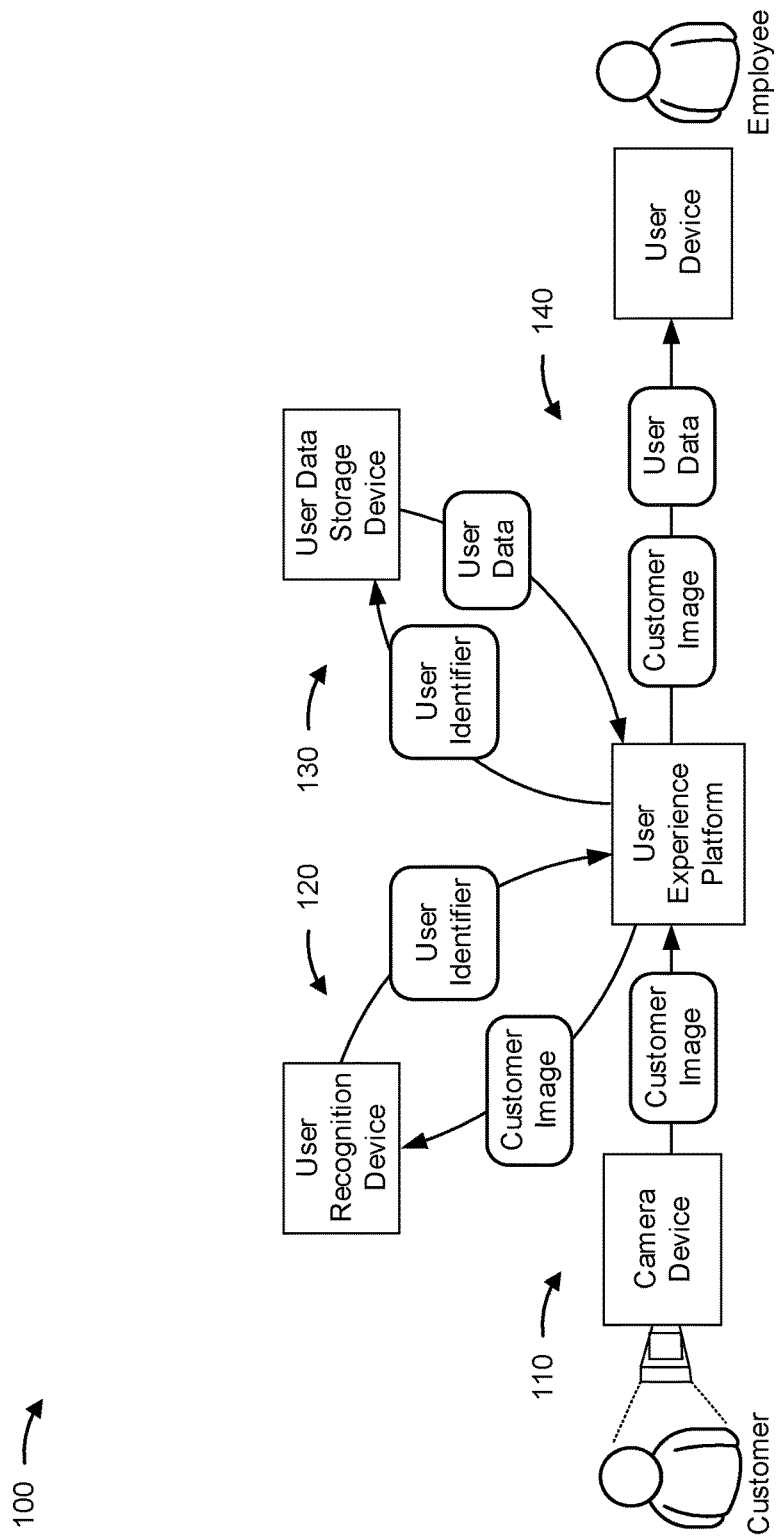
FIG. 1 is a diagram of an overview of an example implementation described herein.

The following detailed description of example implementations refers to the accompanying drawings. The same reference numbers in different drawings may identify the same or similar elements.

People sometimes enter a place of business, such as a retail store, restaurant, or bank, seeking a particular product or service. Other times, people enter a place of business without a particular product or service in mind. In either situation, individuals working at a place of business may not know how to best help a person that enters the place of business without first speaking to the person to understand what that person might be interested in. In some situations, a malicious person may enter a place of business looking to do harm to the business and/or another person, e.g., by committing theft, fraud, and/or the like.

Some implementations, described herein, provide a user experience platform that uses user recognition techniques to identify individuals, in a manner designed to provide those individuals with an enhanced user experience, e.g., when visiting a place of business. For example, the user experience platform may receive, from a camera device located at a place of business, an image of a person (e.g., an image of a person that was captured as the person entered a place of business, such as a retail store). The user experience platform may use the image and a user recognition device (e.g., a facial recognition device) to obtain a user identifier associated with the person. Based on the user identifier, the user experience platform may obtain user data that specifies a variety of information about the person associated with the user identifier (e.g., user shopping preferences, payment account information, previous transactions, and/or the like). The user experience platform may then provide the obtained user data to a user device, such as a user device in possession of an employee at the place of business, enabling the user of the user device to view the information about the person, in a manner designed to enable the user to provide the person that entered the place of business with an enhanced user experience (e.g., providing relevant special offers or suggestions, helpful recommendations, and/or the like). In some implementations, the user data sent to a user device may be used to prevent malicious behavior, such as theft (e.g., from a positive identification of a flagged person), and/or fraud (e.g., by confirming that a person is who they purport to be).

By using user recognition techniques to identify people who enter a place of business, and other techniques to provide user devices with information associated with people who enter the place of business, a user experience platform may provide an enhanced user experience for individuals and obviate the need to use computing resources and technology that might otherwise be used to attempt to improve user experience. For example, a person may opt-in to the user experience platform, which may result in the person having encounters with employees that are more knowledgeable about the person, have relevant offers for the person, and/or otherwise improve the person's experience at a place of business. For a place of business, the user experience platform may enable the place of business and the associated employees to provide a better experience for customers, which may lead to increased sales and conservation of both human and computing resources.

Human resource may be conserved, for example, in situations where the user experience platform provides user devices with user data in a manner designed to notify an employee that is available and near the person associated with the user data, which may reduce time spent by other employees attempting to provide service to the person. Computing resources may be conserved, for example, by obviating the use of complex analytic and marketing technology to target people with advertisements, offers, and the like, enabling a user (e.g., an employee) provide an improved user experience instead. Additionally, in some implementations, the user experience platform may be used for the prevention of malicious behavior, which may help protect the target of fraud, theft, and/or the like.

FIG. 1 is a diagram of an overview of an example implementation 100 described herein. As shown in FIG. 1, example implementation 100 includes a camera device (e.g., still camera, video camera, or device in communication with a camera) for capturing images, a user recognition device (e.g., facial recognition device, voice recognition device, biometric identification device, and/or the like) for recognizing people depicted in images (e.g., images captured by the camera device), a user data storage device (e.g., a server computer, data storage array, local data storage device, and/or the like) for storing user data, a user device (e.g., a smart phone, tablet computer, personal computer, and/or the like) for receiving and displaying user data, and a user experience platform (e.g., a personal computer, server computer, cloud computing platform, and/or the like) for providing user data to the user device.

As further shown in FIG. 1, and by reference number 110, the user experience platform receives, from the camera device, a customer image (e.g., as a customer enters a place of business or a particular area within a place of business). The customer image may depict, for example, a customer which, in the example implementation 100, is labeled "Customer."

As further shown in FIG. 1, and by reference number 120, the user experience platform provides the customer image to a user recognition device and receives a user identifier in return. For example, the user recognition device may be a facial recognition device that performs facial recognition on the customer image in an attempt to identify the customer depicted in the customer image. The customer may have previously registered an image of the face of the customer (e.g., via the user experience platform), enabling a facial recognition device to identify the customer and provide the user experience platform with a user identifier that was previously associated with the customer (e.g., during registration).

As further shown in FIG. 1, and by reference number 130, the user experience platform uses the user identifier to obtain user data from a user data storage device. The user data may include a variety of information related to the person associated with the user identifier (e.g., the customer), including prior activity associated with the customer. User data may include, for example, information regarding previous transactions associated with the customer, a previous image of the customer (e.g., the image used during user registration), the customer's name, payment account information associated with the customer, user preferences associated with the customer, third party provided information associated with the customer, and/or the like. As the user experience platform may be opt-in, the user data may be as sparse or comprehensive as specified by the customer opting into the service.

As further shown in FIG. 1, and by reference number 140, the user experience platform identifies a user device and provides user information to the user device, which in the example implementation 100 is associated with a second person identified as "Employee" (e.g., an employee of a place of business). The user experience platform may identify the user device in a variety of ways (e.g., based on the camera device and user device being physically close to one another, which may indicate that the employee is near the customer). The user information provided to the user device may include a variety of information, such as information included in the user data, as well as the customer image captured by the camera device. This may enable, for example, the employee to use the customer image to identify the customer and then use the user data to provide an enhanced user experience to the customer. In some implementations, the user information may enable the employee to identify the customer as a potentially malicious person.

Accordingly, by using user recognition techniques to identify people who enter a place of business, and other techniques to provide user devices with information associated with people who enter the place of business, a user experience platform may provide an enhanced user experience for individuals and obviate the need to use computing resources and technology that might otherwise be used to attempt to improve user experience. For example, a customer may opt-in to the user experience platform, which may result in the customer having encounters with employees that are more knowledgeable about the customer, have relevant offers for the customer, and/or otherwise improve the customer's experience at a place of business. For a place of business, the user experience platform may enable the place of business and the associated employees to provide a better experience for customers, which may lead to increased sales and conservation of both human and computing resources.

Human resource may be conserved, for example, in situations where the user experience platform provides user devices with user data in a manner designed to notify an employee that is available and near the customer associated with the user data, which may reduce time spent by other employees attempting to provide service to the customer. Computing resources may be conserved, for example, by obviating the use of complex analytic and marketing technology to target people with advertisements, offers, and/or the like, enabling a user (e.g., an employee) provide an improved user experience instead. Additionally, in some implementations, the user experience platform may be used for the prevention of malicious behavior, which may help protect targets of fraud, theft, and/or the like.

As indicated above, FIG. 1 is provided merely as an example. Other examples are possible and may differ from what was described with regard to FIG. 1.

Figure 2:
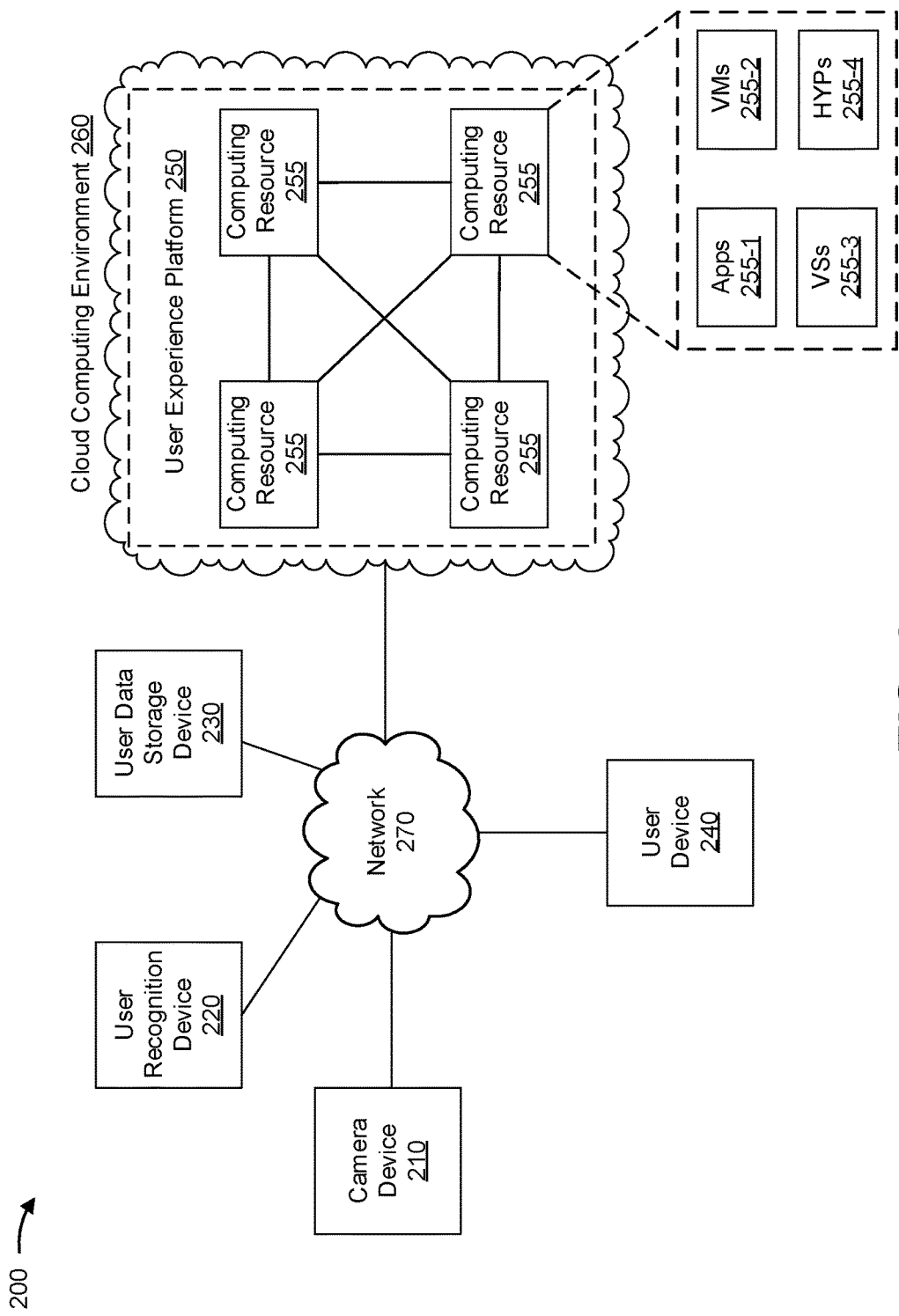
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a camera device 210, a user recognition device 220, a user data storage device 230, a user device 240, a user experience platform 250, a computing resource 255, a cloud computing environment 260, and a network 270. Devices of environment 200 may interconnect via wired connections, wireless connections, or a combination of wired and wireless connections.

Camera device 210 includes one or more devices capable of receiving, generating, storing, processing, and/or providing information associated with one or more images (e.g., photographs), video, and/or audio. For example, camera device 210 may include a digital still camera, analog still camera, digital video camera, analog video camera, a microphone, or a communication and/or computing device in communication with a camera, such as a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), a server device, a group of server devices, a cloud computing device, a data center device, or a similar type of device. Camera device 210 may include hardware, or a combination of hardware and software, that enables camera device 210 to capture an image and/or video and transmit the captured image and/or video to another device or devices, such as user experience platform 250. In some implementations, camera device 210 may be fixed to a particular location (e.g., at a place of business), and in some implementations, camera device 210 may be affixed to an employee (e.g., by a wearable communication device, tablet computer, and/or the like).

User recognition device 220 includes one or more devices capable of receiving, generating, storing, processing, and/or providing information associated with one or more images (e.g., photographs), video, and/or audio. For example, user recognition device 220 may include a communication and/or computing device, such as a desktop computer, a server device, a group of server devices, a cloud computing device, a data center device, or a similar type of device. User recognition device 220 includes hardware, or a combination of hardware and software, that is capable of receiving an image, a video, and/or an audio file, identifying a person included in the image, the video, and/or the audio file, and providing data identifying the person as a result, e.g., to user experience platform 250. User recognition device 220 may include, for example, a facial recognition device capable of identifying a person by analyzing facial features included in an image and/or video; a gait recognition device capable of identifying a person by analyzing the manner in which the person stands, walks, or runs, as depicted in an image and/or video; a biometric recognition device capable of identifying a person by analyzing features of the person's eye(s) included in an image and/or video, a voice recognition device capable of identifying a person by analyzing features of the person's voice in audio, and/or the like.

User data storage device 230 includes one or more devices capable of receiving, generating, storing, processing, and/or providing information associated with user data. For example, user data storage device 230 may include a local hard drive, network hard drive, desktop computer, a server device, a group of server devices, a cloud computing device, a data center device, or a similar type of device. User data storage device 230 may include hardware, or a combination of hardware and software, that is capable of receiving, storing, and providing information related to a user identifier.

User device 240 includes one or more devices capable of receiving, generating, storing, processing, and/or providing information associated with user data. For example, user device 240 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 240 may include one or more components for displaying user data, such as user data received from user experience platform 250. In some implementations, user device 240 may include one or more components (e.g., global positioning satellite (GPS) device, Wi-Fi device, Bluetooth device, and/or the like) for determining the physical location of user device 240.

User experience platform 250 includes one or more devices capable of receiving, generating, storing, processing, and/or providing information associated with images, video, and/or user data. For example, user experience platform 250 may include a server device (e.g., a host server, a web server, an application server, etc.), a data center device, or a similar device. User experience platform 250 is capable of receiving images and/or video from camera device 210, obtaining a user identifier from user recognition device 220, obtaining user data associated with the user identifier from user data storage device 230, and identifying and providing the user data to user device 240.

In some implementations, as shown, user experience platform 250 may be hosted in cloud computing environment 260. Notably, while implementations described herein describe user experience platform 250 as being hosted in cloud computing environment 260, in some implementations, user experience platform 250 might not be cloud-based (i.e., may be implemented outside of a cloud computing environment) or might be partially cloud-based.

Cloud computing environment 260 includes an environment that delivers computing as a service, whereby shared resources, services, etc. may be provided to user experience platform 250. Cloud computing environment 260 may provide computation, software, data access, storage, and/or other services that do not require end-user knowledge of a physical location and configuration of a system and/or a device that delivers the services.

Computing resource 255 includes one or more personal computers, workstation computers, server devices, or another type of computation and/or communication device. In some implementations, computing resource 255 may host user experience platform 250. The cloud resources may include compute instances executing in computing resource 255, storage devices provided in computing resource 255, data transfer devices provided by computing resource 255, etc. In some implementations, computing resource 255 may communicate with other computing resources 255 via wired connections, wireless connections, or a combination of wired and wireless connections.

As further shown in FIG. 2, computing resource 255 may include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that may be provided to or accessed by one or more devices, such as camera device 210, user recognition device 220, user data storage device 230, user device 240, and/or user experience platform 250. Application 255-1 may eliminate a need to install and execute the software applications on devices, such as camera device 210, user recognition device 220, user data storage device 230, user device 240. For example, application 255-1 may include software associated with user experience platform 250 and/or any other software capable of being provided via cloud computing environment 260. In some implementations, one application 255-1 may send/receive information to/from one or more other applications 255-1, via virtual machine 255-2.

Virtual machine 255-2 includes a software implementation of a machine (e.g., a computer) that executes programs like a physical machine. Virtual machine 255-2 may be either a system virtual machine or a process virtual machine, depending upon use and degree of correspondence to any real machine by virtual machine 255-2. A system virtual machine may provide a complete system platform that supports execution of a complete operating system ("OS"). A process virtual machine may execute a single program, and may support a single process. In some implementations, virtual machine 255-2 may execute on behalf of a user (e.g., user device 240), and may manage infrastructure of cloud computing environment 260, such as data management, synchronization, or long-duration data transfers.

Virtualized storage 255-3 includes one or more storage systems and/or one or more devices that use virtualization techniques within the storage systems or devices of computing resource 255. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 may present a virtual operating platform to the guest operating systems, and may manage the execution of the guest operating systems. Multiple instances of a variety of operating systems may share virtualized hardware resources.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
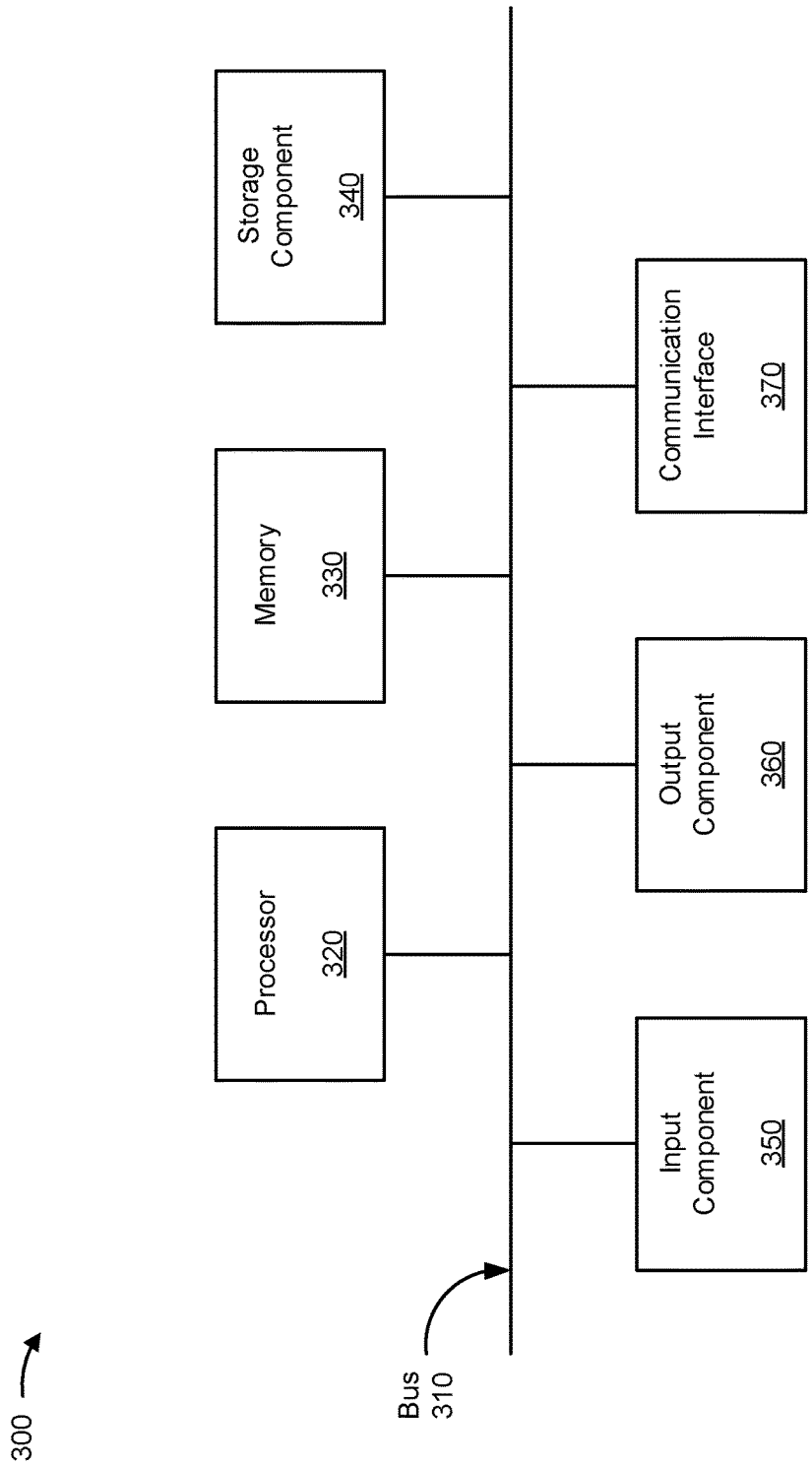
FIG. 3 is a diagram of example components of one or more devices of FIG. 2.

FIG. 3 is a diagram of example components of a device 300. Device 300 may correspond to camera device 210, user recognition device 220, user data storage device 230, user device 240, user experience platform 250, and/or computing resource 255. In some implementations, camera device 210, user recognition device 220, user data storage device 230, user device 240, user experience platform 250, and/or computing resource 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a Bluetooth interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
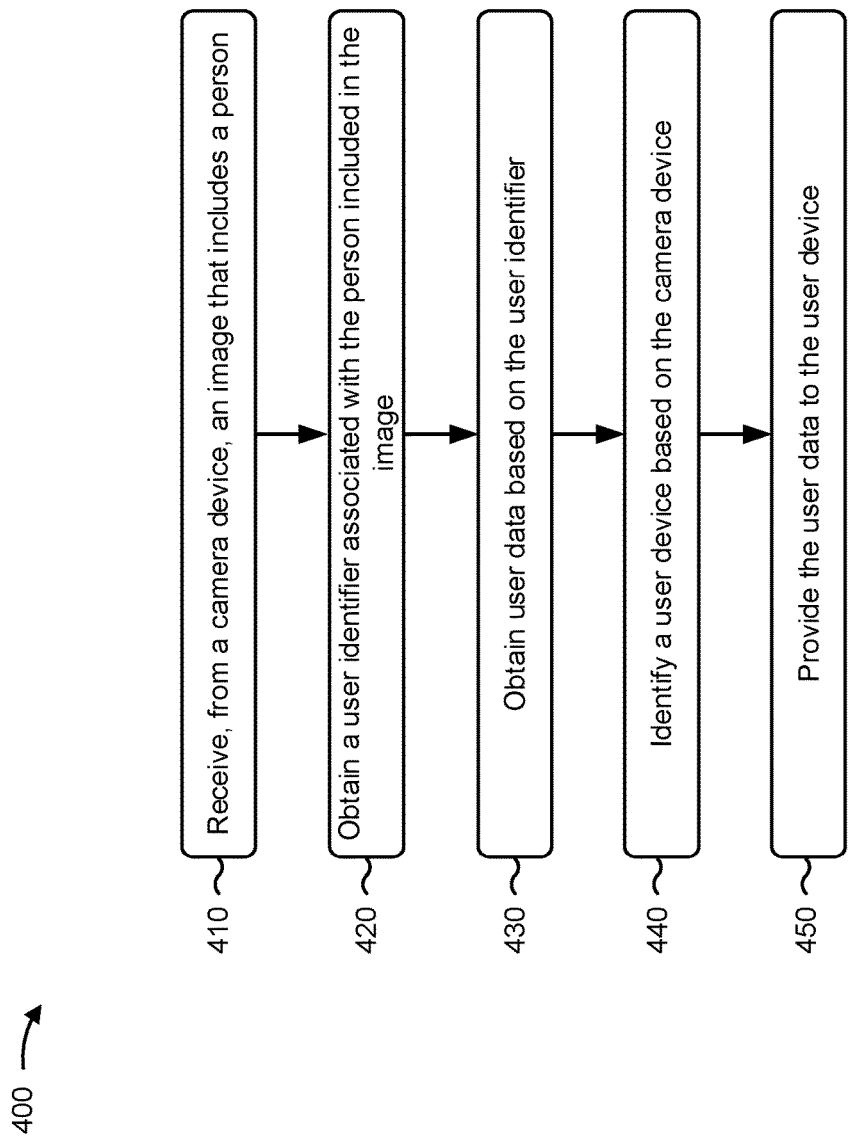
FIG. 4 is a flow chart of an example process for providing a user recognition based user experience platform.

FIG. 4 is a flow chart of an example process 400 for providing a user recognition based user experience platform. In some implementations, one or more process blocks of FIG. 4 may be performed by user experience platform 250. In some implementations, one or more process blocks of FIG. 4 may be performed by another device or a group of devices separate from or including user experience platform 250, such as camera device 210, user recognition device 220, user data storage device 230, and/or user device 240.

As shown in FIG. 4, process 400 may include receiving, from a camera device, an image that includes a person (block 410). For example, user experience platform 250 may (e.g., using computing resource 255, processor 320, input component 350, and/or communication interface 370) receive, from camera device 210, an image that includes a customer. For example, camera device 210 may be located at a place of business (e.g., fixed to a particular spot, such as a security camera or camera attached to a checkout kiosk, or included in user device 240 of an employee at the place of business) and designed to capture images of customers as they pass within the camera's field of view. The image may include a still image or photograph, an image obtained from a video camera frame, a video clip, and/or the like.

In some implementations, it may be intended that camera device 210 captures and provides images to user experience platform 250 automatically. For example, a security camera is generally always on, and may send user experience platform 250 continuous video, periodic video clips, still images from the video, and/or the like. In this situation, the images provided to user experience platform 250 may not all include an image of a customer, in which case the image is not likely to be used for user recognition. As another example, a checkout kiosk may include a camera that automatically and periodically captures images, which may be provided to user experience platform 250. In this situation, user experience platform 250 may analyze each image to determine whether a person is depicted in the image and the image may be discarded, for example, if a person is not included in the image, if the person is not identifiable from the image, if an image does not meet a threshold measure of clarity for identifying a person included in the image, and/or the like.

In some implementations, camera device 210 may include hardware or a combination of hardware and software that is designed to capture images or video in response to the occurrence of an event. For example, sensor devices, such as motion detection sensors, may use sensor data to cause a camera device to activate image capture based on detecting movement. As another example, facial recognition software may cause a camera device to activate image capture when a face is detected. Based on the capturing of an image, devices designed to capture images in response to the occurrence of an event may provide user experience platform 250 with the captured images as they are captured.

In some implementations, camera device 210 may be manually triggered to capture an image of a customer. For example, camera device 210 may be included in user device 240, which a user (e.g., an employee) may use to intentionally capture the image of the customer. As another example, a user may remotely trigger camera device 210 (e.g., in response to observing a customer on a camera feed) to capture the image of the customer. In this situation, the image of the customer may be provided to user experience platform 250 manually (e.g., by the user operating camera device 210) or automatically (e.g., by camera device 210 or corresponding user device 240).

In this way, user experience platform 250 may receive, from camera device 210, an image that includes a person, enabling user experience platform 250 to identify the person and improve user experience.

As further shown in FIG. 4, process 400 may include obtaining a user identifier associated with the person included in the image (block 420). For example, user experience platform 250 may (e.g., using computing resource 255, processor 320, input component 350, and/or communication interface 370) obtain, from user recognition device 220, a user identifier associated with the customer included in the image. User recognition device 220 may, in some implementations, be included in user experience platform 250 or, in some implementations, user recognition device 220 may be separate from user experience platform 250. User recognition device 220 may determine the user identifier based on the image of the customer, which user experience platform 250 may provide. The user identifier may include a variety of forms of identification, such as a string of characters, an image of the user, a voice pattern, and/or the like. After identifying the customer included in the image and identifying a corresponding user identifier, user recognition device 220 may provide the user identifier to user experience platform 250.

In some implementations, user recognition device 220 may be a facial recognition device that uses facial features of the customer to identify the customer depicted in the image. For example, the customer included in the image may have previously registered with the facial recognition device (e.g., by providing facial recognition device with a training image depicting the face of the customer). In some implementations, other types of user recognition device(s) 220 may be used. For example, user recognition device 220 may be a gait recognition device that makes use of images and/or video to identify a customer based on the manner in which the customer stands, walks, or runs. As another example, user recognition device 220 may be an object recognition device designed to recognize an object included in an image, which enables identifying the customer, such as a nametag, matrix barcode, and/or the like.

In some implementations, the customer included in the image, and for which the user identifier is obtained, previously registered (e.g., opted in) with user experience platform 250 and/or user recognition device 220. For example, when opting into the user experience platform 250, the customer may provide (e.g., in addition to other data, such as customer name, address, contact information, shopping preferences, and/or the like) training data that can be used to identify the customer from images. Training data may include, for example, one or more images of the customer's face, one or more video clips of the customer walking, a matrix barcode, name tag, and/or the like. The training data may enable user recognition device 220 to train a recognition model, which may be used to later identify the customer from other images. In some implementations, the user identifier may be assigned to the customer at the time of registration, enabling user recognition device 220 to match an image of a customer to that customer's user identifier. The user identifier may be designed to uniquely identify the customer, such as a unique string of letters, numbers, a facial signature, biometric signature, voice recognition signature, and/or the like.

In this way, user experience platform 250 may obtain, from user recognition device 220, a user identifier associated with the person included in the image, enabling user experience platform 250 to obtain user data associated with the person included in the image.

As further shown in FIG. 4, process 400 may include obtaining user data based on the user identifier (block 430). For example, user experience platform 250 may (e.g., using computing resource 255, processor 320, memory 330, storage component 340, input component 350, and/or communication interface 370) obtain user data based on the user identifier. The user data may be obtained, for example, from user data storage device 230, which may be included in or otherwise in communication with user experience platform 250. For example, the user data may be stored in a database or other data structure, enabling user experience platform 250 to query user data storage device 230 using the user identifier, receive user data in response to the query.

In some implementations, user data may include at least one other image associated with the user identifier (e.g., other images depicting the customer included in the image). For example, user data may include a registered image that depicts the customer at the time of registration (e.g., training image(s)) and/or other images, such as updated images the customer associated with the user identifier may have provided to user experience platform 250, images that were captured by camera device 210 or other camera devices 210 and stored by user data storage device 230, and/or the like.

In some implementations, user data may include information identifying the customer associated with the user identifier. For example, a variety of information could be used to identify the customer, such as a name, nickname, username, electronic mail address, hair color, eye color, height, and/or the like.

In some implementations, user data may include information identifying user account information for the customer associated with the user identifier. For example, at a place of business, a customer may have an account, such as a store credit card, loyalty account, and/or the like, the details of which may be included in the user data. In addition, user payment account information, such as credit card information, debit card information, and/or the like, may also be included in user data.

In some implementations, user data may include location-based information associated with a physical location of a camera device 210. For example, in a situation where camera device 210 is associated with a place of business, user data may include historical transaction information, such as retail purchase history for a retailer, previous order information for a restaurant, account activity for a bank, and/or the like.

In some implementations, user data may include information obtained from a third party device. For example, Internet shopping history associated with the user identifier may be collected by a third party device and shared with user experience platform 250. As another example, another place of business may share user data with user experience platform 250 (e.g., in a situation where a customer has opted in to sharing user data from third party devices, such as those at another place of business).

In some implementations, user data may include information regarding malicious activity of the customer. For example, the customer may have been flagged as a thief, be the subject of a warning issued by law enforcement, and/or the like.

As noted above, a large variety of user data may be obtained by user experience platform 250, and other example types of user data may also be included in the user data obtained by user experience platform. In some implementations, the person associated with the user identifier (e.g., the customer) may control the manner in which user data is collected or used (e.g., by opting in, or out, of the storage and/or use of particular types of user data). In this way, user experience platform 250 may obtain user data based on the user identifier, enabling user experience platform 250 to provide the user data to a user device, e.g., in a manner designed to enable the user of the user device to provide a customer with an enhanced user experience.

As further shown in FIG. 4, process 400 may include identifying a user device based on the camera device (block 440). For example, user experience platform 250 may (e.g., using computing resource 255, processor 320, input component 350, output component 360, and/or communication interface 370) identify user device 240 based on camera device 210. In some implementations, user experience platform 250 may identify user device 240 in a manner designed to enhance the experience of the customer (e.g., the customer included in the image captured by camera device 210). The identification of user device 240 may be performed in a variety of ways.

In some implementations, user experience platform 250 identifies user device 240 based on camera device 210 being included in or attached to user device 240. For example, in a situation where user device 240 is a tablet computer that includes a camera that was used to capture the image of the customer, user experience platform 250 may determine that the tablet computer should be provided with the user data (e.g., enabling the user of the tablet computer, which was used to capture the image of the customer, to use user data to enhance the customer's user experience). As another example, a retail checkout kiosk or bank employee terminal may include or be attached to a camera that captured the image of the customer, in which case user experience platform 250 may identify the retail checkout kiosk or bank employee terminal as the user device 240 to which user data should be provided.

In some implementations, camera device 210 is associated with a physical location, and user experience platform 250 may identify user device 240 based on the physical location of camera device 210 and a physical location associated with user device 240. For example, the physical location of cameras (e.g., security cameras, cameras included in kiosks, cameras included in tablet computers, and/or the like) may be determined in a variety of ways. The physical location of some cameras may be predetermined (e.g., such as a fixed security camera and/or camera included in a stationary kiosk), while the physical location of some cameras may be determined by components included in camera device 210 (e.g., such as GPS, Wi-Fi, or Bluetooth location information that can be provided by components of a camera that includes the foregoing components or a camera that is included in another device that include the foregoing components). Similarly, components included in user device 240 may be used to determine a location of user device 240 (e.g., GPS components, Wi-Fi components, Bluetooth components, and/or the like, may be included in user device 240 and used to determine the physical location of user device 240). Based on the physical location of camera device 210 being proximate to the physical location of user device 240 (e.g., in a situation where the devices are within a threshold measure of distance from one another), user experience platform 250 may identify user device 240 as the device to which user data should be provided, e.g., in a manner designed to enable an employee at a business location the receive user data for a customer that is likely to near the employee.

In some implementations, multiple user devices 240 may be associated with a physical location near camera device 210. For example, in a retail store, many employees may have user devices 240 (such as a tablet computer), and multiple employees (and their corresponding user devices 240) may be physically near camera device 210 (e.g., near the customer included in the image captured by a security camera). In this situation, user experience platform 250 may identify one of the multiple user devices 240 in a variety of ways. For example, user devices 240 may be assigned a priority value based on a variety of factors, and user experience platform 250 may identify the device with the highest priority as the device to which user data should be sent. Factors that user experience platform 250 may use to identify user device 240 may include, for example, data indicating whether the employee associated with user device 240 is available, a physical measure of distance between user device 240 and camera device 210, previous experience that a particular employee associated with user device 240 may have with the customer included in the image, and/or the like.

In some implementations, user experience platform 250 may use camera device 210 to identify user device 240 (e.g., the device to which user data should be provided). For example, a retail store may include many security cameras, at least one of which may have identified an employee (e.g., a user of user device 240). Based on identifying the employee using camera device 210 (e.g., in a manner similar to the manner in which the customer in the image was identified), user experience platform 250 may identify user device 240 of the employee as the device to which user data should be provided. In some implementations, such as a situation where multiple cameras are used, and where physical location is used to identify user device 240, physical locations of the cameras may be used to identify an employee (e.g., an employee with user device 240) that is likely to be near the camera that captured the image of the customer. For example, in a retail store with multiple security cameras, the employee that is closest to the security camera that captured the image of the customer may be identified (e.g., via one of the security cameras), and user experience platform 250 may identify (e.g., as user device 240 to which user data should be sent) a device associated with the identified employee.

In some implementations, user device 240 may identify user device 240 to user experience platform 250. For example, user experience platform 250 may broadcast to multiple user devices 240, or otherwise make available to user devices 240 (e.g., via an application, web page, and/or the like), user data for the customer included in the image. In this situation, employees associated with the user devices 240 may claim user data, or otherwise indicate to user experience platform 250 that the employee of the corresponding user device 240 is interested in using the user data to provide the customer with an enhanced user experience.

By way of example, user experience platform 250, after obtaining user data, may broadcast a request to multiple user devices 240 at a retail location, enabling the employees using the user devices 240 to determine whether they are available and/or interested in assisting the customer associated with the user data.

In this way, user experience platform 250 may identify a user device based on the camera device, enabling user experience platform 250 to provide the user data to the identified user device, e.g., in a manner designed to provide the customer associated with the user data with an enhanced user experience.

As further shown in FIG. 4, process 400 may include providing the user data to the user device (block 450). For example, user experience platform 250 may (e.g., using computing resource 255, processor 320, output component 360, and/or communication interface 370) provide the user data to user device 240. For example, user experience platform 250 may provide the user data to user device 240 via network 270. Providing the user data to user device 240 may enable the employee using user device 240 to provide an enhanced user experience (e.g., for the customer associated with the user data).

In some implementations, the user data (or other data sent to user device 240 that is associated with the user data) causes user device 240 to display at least a portion of the user data on a display of user device 240. For example, the user data may include or be associated with instructions that cause an application operating on user device 240 (e.g., a web browsing application, user experience application, and/or the like) to cause display of some of the information regarding the customer associated with the user data (e.g., the image of the customer, the customer's name, and/or the like). As described in further detail below, causing the display of user data on user device 240 may enable the employee using user device 240 to provide an enhanced experience for the customer associated with the user data.

In some implementations, the user data provided to user device 240 may include any of the user data obtained by user experience platform 250 (e.g., user data obtained in block 430). By way of example, user data may include a registered image depicting a registered user associated with the user identifier (e.g., the image the customer included in the image used to register with user recognition device 220); having a registered image of the customer may enable the employee using user device 240, for example, to positively identify the customer using the image. User data may include information identifying the registered user associated with the user identifier (e.g., the customer's name, nickname, and/or the like); having information identifying the customer may enable the employee using user device 240, for example, to greet the customer by name. In a situation where user experience platform 250 is used for fraud prevention, the customer's name may be used to prevent fraud (e.g., in a situation where the customer may give a false name to impersonate someone else).

User data may also include information identifying user account information for the registered user associated with the user identifier (e.g., such as a customer loyalty number, member identifier, bank account number, and/or the like); user account information may enable the employee using user device 240, for example, to look up preferences the customer may have that are associated with the user account, apply loyalty program benefits automatically for the customer, and/or the like. User data may include location-based information associated with the physical location of camera device 210 (e.g., information specific to a retail store location, bank location, and/or the like, such as purchase history at the location, preferences associated with the location, and/or the like); location-based information may enable the employee using user device 240, for example, provide the customer with suggestions, information, services, and/or products associated with the customer's preferences.

As another example, user data may include information obtained from a third party device and associated with the user identifier (e.g., Internet shopping history, shopping history from another retail location, services obtained from another place of business, and/or the like); information obtained from a third party device may enable the employee using user device 240, for example, to provide the customer with a variety of information, offers, and/or the like, that may be relevant to the customer, e.g., in a manner designed to improve the customer's experience.

In some implementations, user experience platform 250 may provide the image of the customer (e.g., the image captured by camera device 210 as the customer entered the place of business) to user device 240. In this situation, the image of the customer is likely to be the most recent image available to user device 240, which may increase the likelihood that the employee using user device 240 is able to positively identify the customer (e.g., from the image captured by camera device 210). In addition, this may enable the employee using user device 240 to provide the image of the customer as an image to be stored in user data storage device 230 and/or provided to user recognition device 220 (e.g., to assist in subsequent user identifications).

In some implementations, user experience platform 250 may identify user experience data to send to user device 240 (e.g., alternatively to, or in addition to, the user data). For example, user experience data may include suggested offers (e.g., coupons, discounts, and/or the like), suggested services, suggested products, and/or the like. In some implementations, user experience data may be based on the user data. For example, user experience platform 250 may provide a special offer based on user data indicating that it is a customer's birthday, provide a coupon based on the customer spending a threshold amount at the business location, and/or the like. In some implementations, the user experience data may cause user device 240 to take an action. For example, user device 240 may include a store coupon printer that prints a coupon to be provided to the customer based on receipt of the user experience data. As another example, user device 240 may include a restaurant ordering system that places an order for a particular drink and/or meal based on receipt of the user experience data. The user experience data may be based on the user data (e.g., based on historical purchases, shopping history, and/or the like) and, in some implementations, may make use of analytics to determine which user experience data should be provided.

In this way, user experience platform 250 may provide the user data to user device 240, enabling a user of user device 240 (e.g., an employee) to use the information provided by user experience platform 250 to provide an enhanced user experience for the customer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using user recognition techniques to identify people who enter a place of business, and other techniques to provide user devices 240 with information associated with people who enter the place of business, user experience platform 250 may provide an enhanced user experience for individuals and obviate the need to use computing resources and technology that might otherwise be used to attempt to improve user experience. For example, a person may opt-in to user experience platform 250, which may result in the person having encounters with employees that are more knowledgeable about the person, have relevant offers for the person, and/or otherwise improve the person's experience at a place of business. For a place of business, user experience platform 250 may enable the place of business and the associated employees to provide a better experience for customers, which may lead to increased sales and conservation of both human and computing resources.

Human resource may be conserved, for example, in situations where user experience platform 250 provides user devices 240 with user data in a manner designed to notify an employee that is available and near the customer associated with the user data, which may reduce time spent by other employees attempting to provide service to the customer. Computing resources may be conserved, for example, by obviating the use of complex analytic and marketing technology to target people with advertisements, offers, and/or the like, enabling a user (e.g., an employee) provide an improved user experience instead. Additionally, in some implementations, user experience platform 250 may be used for the prevention of malicious behavior, which may help protect targets of fraud, theft, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memory devices; and
one or more processors, communicatively connected to the one or more memory devices, to:
receive, from a camera device, a plurality of images;
analyze, using a computer-implemented user recognition technique, the plurality of images to identify an image that includes a person;
determine, for another image of the plurality of images, that the person is not identifiable from the other image;
discard the other image based on the determination that the person is not identifiable from the other image;
provide the image to a user recognition device;
receive, from the user recognition device, a user identifier based on the person included in the image;
obtain user data based on the user identifier,
the user data relating to prior activity relating to the person associated with the user identifier;
identify a user device based on,
a first physical location associated with the camera device,
a second physical location associated with the user device, and
a measure of distance between the first physical location associated with the camera device and the second physical location associated with the user device; and
provide the user data to the user device,
the user device being associated with a user that is different from the person.

2. The device of claim 1, wherein the one or more processors are further to:
receive, from the camera device, data identifying the first physical location.

3. The device of claim 1, wherein:
the image includes a face of the person; and
the user recognition device is a facial recognition device.

4. The device of claim 1, wherein the one or more processors are further to:
receive, from a second camera device, data indicating the second physical location.

5. The device of claim 4, wherein the data indicating the second physical location includes:
a second image depicting the user of the user device.

6. The device of claim 1, wherein the one or more processors are further to:
receive, from the user device, data indicating the second physical location.

7. The device of claim 6, wherein the data indicating the second physical location includes:
sensor data obtained from one or more sensor devices associated with the user device.

8. The device of claim 1, wherein the one or more processors, when identifying the user device, are further to:
identify the user device based on a measure of priority associated with the user device,
the measure of priority indicating that the user device is associated with a highest measure of priority relative to other measures of priority associated with other user devices.

9. A non-transitory computer-readable medium storing instructions, the instructions comprising:
one or more instructions that, when executed by one or more processors, cause the one or more processors to:
receive, from a camera device, a plurality of images;
analyze, using a computer-implemented user recognition technique, the plurality of images to identify an image that includes a person;
determine, for another image of the plurality of images, that the person is not identifiable from the other image;
discard the other image based on the determination that the person is not identifiable from the other image;
provide the image to a user recognition device;
obtain, from the user recognition device, a user identifier associated with the person included in the image;
obtain user data based on the user identifier,
the user data including:
previously collected information regarding the person associated with the user identifier, or
a previously captured image of the person associated with the user identifier;
identify a user device based on,
a first physical location associated with the camera device,
a second physical location associated with the user device, and
a measure of distance between the first physical location associated with the camera device and the second physical location associated with the user device; and
provide the user data to the user device,
the user device being associated with a user that is different from the person.

10. The non-transitory computer-readable medium of claim 9, wherein the one or more instructions, that cause the one or more processors to identify the user device, cause the one or more processors to:
identify the user device from a plurality of user devices based on the first physical location associated with the camera device being closer to the second physical location associated with the user device than other physical locations associated with other user devices included in the plurality of user devices.

11. The non-transitory computer-readable medium of claim 9, wherein the one or more instructions, when executed by the one or more processors, further cause the one or more processors to:
provide the image to the user device.

12. The non-transitory computer-readable medium of claim 9, wherein the user data provided to the user device causes the user device to display at least a portion of the user data.

13. The non-transitory computer-readable medium of claim 9, wherein the one or more instructions, when executed by the one or more processors, further cause the one or more processors to:
identify user experience data based on the user data,
the user experience data including a suggested offer for the person associated with the user identifier; and
provide the user experience data to the user device.

14. A method, comprising:
- receiving, by a first device and from a camera device, a plurality of images;
- analyzing, by the first device and using a computer-implemented user recognition technique, the plurality of images to identify an image that includes a person, the person being different from a user associated with the first device;
- determining, by the first device and for another image of the plurality of images, that the person is not identifiable from the other image;
- discarding, by the first device, the other image based on the determination that the person is not identifiable from the other image;
- obtaining, by the first device, a user identifier associated with the person included in the image;
- obtaining, by the first device, from a user data storage device, and based on the user identifier, user data,
  - the user data including:
    - previously collected information regarding the person associated with the user identifier, and
    - a previously captured image of the person associated with the user identifier, and
  - the user data being obtained based on a measure of distance between a first physical location associated with the camera device and a second physical location associated with the first device;
- identifying, by the first device, user experience data,
  - the user experience data including a suggested offer for the person associated with the user identifier,
    - the suggested offer being based on the user data; and
- causing, by the first device, display of the user data and the suggested offer.

15. The method of claim 14, wherein the user data includes at least one of:
- a registered image depicting a registered user associated with the user identifier,
- information identifying the registered user associated with the user identifier,
- information identifying user account information for the registered user associated with the user identifier,
- location-based information associated with a physical location of the camera device, or
- information obtained from a third party device and associated with the user identifier.

16. The method of claim 15, wherein the registered image was provided by the registered user at a time the registered user registered.

17. The method of claim 15, wherein the information identifying the registered user associated with the user identifier includes a name associated with the registered user.

18. The method of claim 15, wherein the information identifying user account information for the registered user associated with the user identifier includes user payment account information.

19. The method of claim 15, wherein the location-based information associated with the physical location of the camera device includes retail purchase history associated with a retailer.

20. The method of claim 15, wherein the information obtained from the third party device includes Internet shopping history associated with the registered user.

* * * * *